US012249907B2

(12) United States Patent
Wang et al.

(10) Patent No.: US 12,249,907 B2
(45) Date of Patent: Mar. 11, 2025

(54) NOISE CONTROL CIRCUIT FOR A SWITCHING MODE POWER SUPPLY AND A METHOD THEREOF

(71) Applicant: Chengdu Monolithic Power Systems Co., Ltd., Chengdu (CN)

(72) Inventors: Shuai Wang, Hangzhou (CN); Hui Li, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 223 days.

(21) Appl. No.: 17/983,544

(22) Filed: Nov. 9, 2022

(65) Prior Publication Data
US 2023/0170788 A1 Jun. 1, 2023

(30) Foreign Application Priority Data
Nov. 30, 2021 (CN) .......................... 202111438440.1

(51) Int. Cl.
*H02M 3/335* (2006.01)
*H02M 1/14* (2006.01)

(52) U.S. Cl.
CPC ....... *H02M 1/143* (2013.01); *H02M 3/33515* (2013.01); *H02M 3/33523* (2013.01)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466;
(Continued)

(56) References Cited

U.S. PATENT DOCUMENTS 5,623,397 A * 4/1997 Vinciarelli ........ H02M 3/33576
363/16
6,188,209 B1 * 2/2001 Poon ..................... H02M 3/158
323/224
(Continued)

*Primary Examiner* — Sean Kayes
*Assistant Examiner* — Nusrat Quddus
(74) *Attorney, Agent, or Firm* — Perkins Coie LLP

(57) ABSTRACT

A noise control circuit of a switching mode power supply is disclosed. The switching mode power supply has a primary switch, a secondary switch and a transformer with a primary winding and a secondary winding. The noise control circuit includes a reverse noise generating circuit having a first input terminal coupled to a first pulse terminal or a second pulse terminal of the primary switch, a second input terminal configured to receive an adjusting signal, and an output terminal configured to provide a noise control signal. The secondary winding has a first terminal and a second terminal. The noise control signal is coupled to either terminal of the secondary winding of the transformer.

15 Claims, 7 Drawing Sheets

(58) Field of Classification Search
CPC ........... H02M 7/5387; H02M 7/53871; H02M 7/53873; H02M 7/53875; H02M 1/084; H02M 1/0845; Y02B 70/1491; H02J 3/46; H02J 3/38
See application file for complete search history.

(56) References Cited

U.S. PATENT DOCUMENTS

| | | | |
|---|---|---|---|
| 6,307,761 B1 * | 10/2001 | Nakagawa | ............ H02M 3/285 |
| | | | 363/70 |
| 9,287,793 B2 * | 3/2016 | Zhang | ............... H02M 3/33507 |
| 10,003,255 B1 | 6/2018 | Jull et al. | |
| 10,348,182 B2 | 7/2019 | Wang | |
| 10,620,677 B2 | 4/2020 | Luo et al. | |
| 2010/0195355 A1 * | 8/2010 | Zheng | ............... H02M 3/33507 |
| | | | 363/21.12 |
| 2011/0305043 A1 * | 12/2011 | Matsumoto | ....... H02M 3/33592 |
| | | | 363/21.01 |
| 2012/0235596 A1 | 9/2012 | Yao et al. | |
| 2015/0124494 A1 * | 5/2015 | Malinin | ............ H02M 3/33592 |
| | | | 363/21.14 |
| 2015/0280578 A1 * | 10/2015 | Huang | ................... H02M 1/32 |
| | | | 363/21.12 |
| 2020/0313562 A1 * | 10/2020 | Hyugaji | ............ H02M 3/33592 |
| 2022/0020676 A1 | 1/2022 | Yu | |

* cited by examiner

NOISE CONTROL CIRCUIT FOR A SWITCHING MODE POWER SUPPLY AND A METHOD THEREOF

CROSS-REFERENCE TO RELATED APPLICATIONS

This application claims priority to and the benefit of Chinese Patent Application No. 202111438440.1, filed on Nov. 30, 2021, which is incorporated herein by reference in its entirety.

FIELD

The present invention relates generally to switching mode power supplies, and more particularly but not exclusively to noise control circuits and the method thereof for the switching mode power supplies.

BACKGROUND

A switching mode power supply converts input power to output power with required voltage and current supplied to a load. The switching mode power supply controls the output power by turning on and off switches with certain frequency or duty cycle, which inevitably produces switching noise. This switching noise manifests itself as a ripple voltage or ripple current at switching nodes of the switching mode power supply. Reduction of such ripple voltage or current becomes a necessary design requirement in order to comply with international standards of the power supplies.

SUMMARY

It is an object of the present invention to provide a noise canceling circuit to reduce noise current caused by switching and introduced by parasitic coupling capacitors between isolated sides of an isolating device of the switching mode power supply.

In accomplishing the above and other objects, there has been provided, in accordance with an embodiment of the present invention, a noise control circuit of a switching mode power supply, wherein the switching mode power supply has a primary switch, a secondary switch and a transformer with a primary winding, and a secondary winding having a first terminal and a second terminal, and wherein the primary switch has a first pulse terminal configured to receive a switching control signal for controlling the primary switch, and a second pulse terminal coupled to the primary winding, the noise control circuit comprising: a reverse noise generating circuit, having a first input terminal coupled to either the first or the second pulse terminal of the primary switch, a second input terminal configured to receive an adjusting signal, and an output terminal configured to provide a noise control signal in response to the adjusting signal and a signal at the pulse terminal that the reverse noise generating circuit is coupled to; wherein the noise control signal is coupled to either terminal of the secondary winding of the transformer.

In accomplishing the above and other objects, there has been provided, in accordance with an embodiment of the present invention, a noise control circuit of a switching mode power supply, wherein the switching mode power supply has a primary switch with a first terminal, a second terminal and a third terminal, a secondary switch and a transformer with a primary winding and a secondary winding, the primary winding having a first terminal and a second terminal, the noise control circuit comprising: a reverse noise generating circuit, having an input terminal coupled to a connection node of the secondary switch and the secondary winding to receive a noise signal, a control terminal configured to receive an adjusting signal, and an output terminal configured to provide a noise control signal in response to the noise signal and the adjusting signal, wherein the noise control signal is coupled to one of the first terminal and the second terminal of the primary winding, the first terminal, the second terminal, the third terminal of the primary switch, and a primary side ground reference.

In accomplishing the above and other objects, there has been provided, in accordance with an embodiment of the present invention, a switching mode power supply having a transformer with a primary winding and a secondary winding having a first terminal and a second terminal, comprising: a primary switch, controlled to be on and off by a switching control signal, wherein the primary switch has a first pulse terminal configured to receive a switching control signal for controlling the primary switch, and a second pulse terminal coupled to the primary winding of the transformer; and a noise control circuit comprising: a reverse noise generating circuit, having a first input terminal coupled to either the first or the second pulse terminal of the primary switch, a second input terminal configured to receive an adjusting signal, and an output terminal configured to provide a noise control signal in response to the adjusting signal and a signal at either the first or the second pulse terminal that the reverse noise generating circuit is coupled to; wherein the noise control signal is coupled to either terminal of the secondary winding of the transformer.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
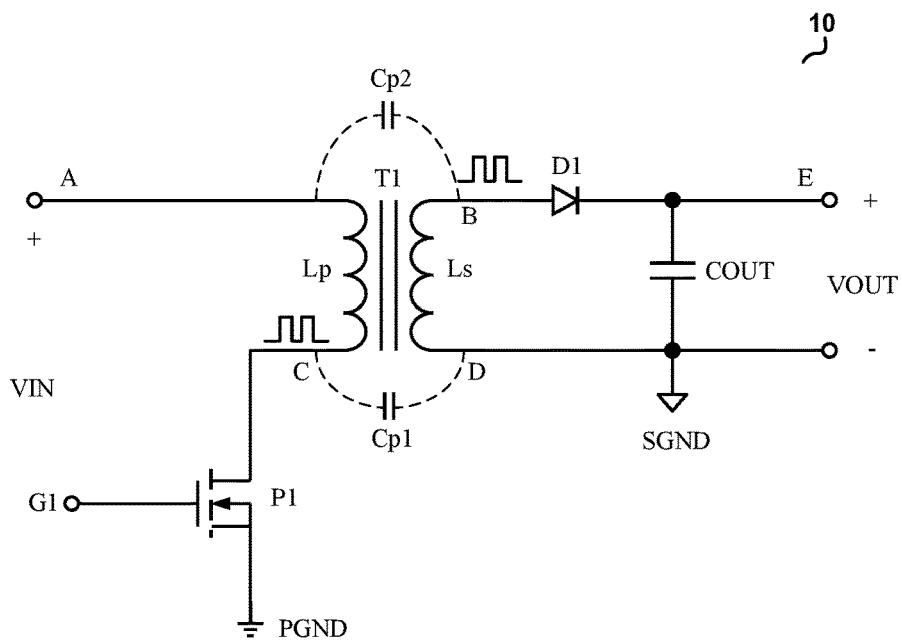
FIG. 1 shows a prior art isolated switching mode power supply 10.

FIG. 1 shows a prior art isolated switching mode power supply 10. As shown in FIG. 1, the isolated switching mode power supply 10 includes an energy storage component T1, i.e., a transformer, a primary switch P1, a secondary switch D1 and an output capacitor COUT coupled in a flyback topology. The transformer T1 comprises a primary winding Lp and a secondary winding Ls, which isolate the switching mode power supply to a primary side circuit having components electrically coupled to the primary switch P1 and a secondary side circuit having components electrically coupled to the secondary switch D1, wherein each of the primary winding and the secondary winding has a first terminal and a second terminal. The primary switch P1 is coupled to the primary winding Lp, and the secondary switch D1 is coupled to the secondary winding Ls. The primary switch Lp is turned on and off by a switching control signal G1 to transfer power from a power supply terminal "A" to an output terminal "E" of the switching mode power supply 10 to power a load (not shown) with a required output voltage VOUT.

In the isolated switching mode power supply 10, the primary winding Lp is coupled to a primary side ground reference PGND when the primary switch P1 is on and is disconnected from the primary side ground reference PGND when the primary switch P1 is off. By on and off operation of the primary switch P1, a pulsing signal is generated at a connecting node C of the primary winding Lp and the primary switch P1. Similarly, by on and off operation of the secondary switch D1, a pulsing signal is generated at a connecting node "B" of the secondary winding Ls and the secondary switch D1. The pulsing signal at the connecting node "C", i.e., the noise, is coupled to the secondary winding Ls by a parasitic capacitor Cp1 between the primary winding Lp and the secondary winding Ls. The noise is going back to the power supply terminal "A" through parasitic capacitors between the secondary side circuit and a common ground of the switching mode power supply 10, and thus pollute a power source of the isolated switching mode power supply 10 coupled to the power supply terminal "A". The pulsing signal at the connecting node "B" is coupled to the power supply terminal "A" by a parasitic capacitor Cp2 between the primary winding Lp and the secondary winding Ls, and thus pollute the power source.

Figure 2:
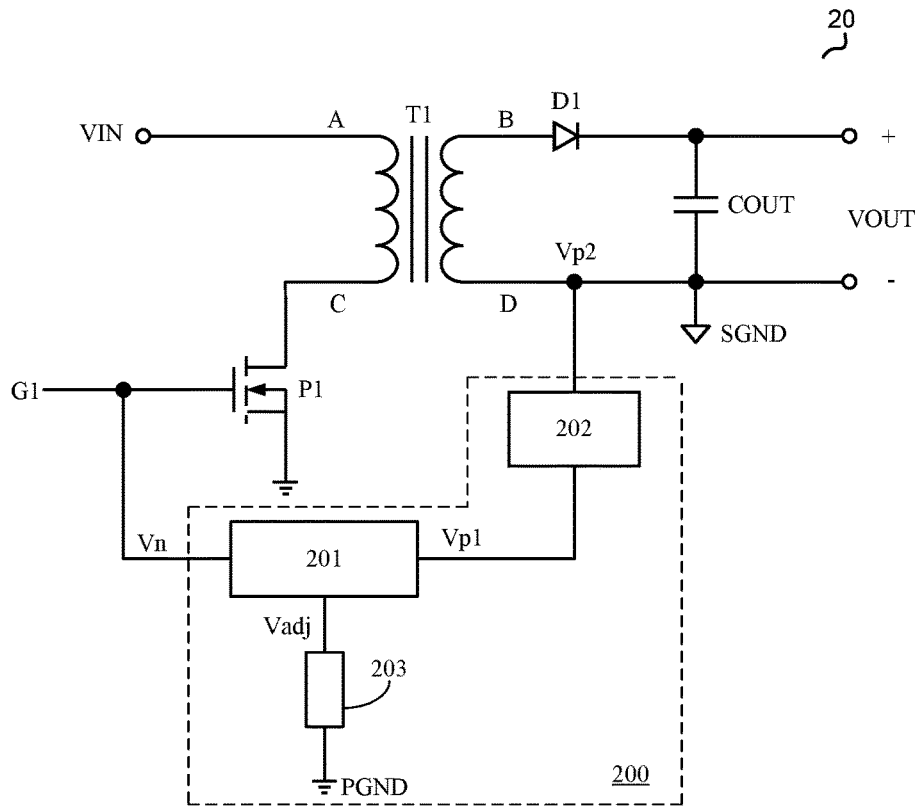
FIG. 2 schematically shows a switching mode power supply 20 in accordance with an embodiment of the present invention.

FIG. 2 schematically shows a switching mode power supply 20 in accordance with an embodiment of the present invention. The switching mode power supply 20 has the flyback topology, and includes the transformer T1, the primary switch P1, the secondary switch D1, and the noise control circuit 200 as shown in FIG. 2. The noise control circuit 200 includes a reverse noise generating circuit 201, a coupling circuit 202 and an adjusting circuit 203. The reverse noise generating circuit 201 has a first input terminal configured to receive a noise signal Vn, a second input terminal configured to receive an adjusting signal Vadj, and an output terminal configured to provide a noise control signal Vp1 in response to the noise signal Vn and the adjusting signal Vadj. The coupling circuit 202 has a first terminal coupled to the output terminal of the reverse noise generating circuit 201 to receive the noise control signal Vp1, and a second terminal connected to a secondary side ground reference SGND of the switching mode power supply 20. The adjusting circuit 203 has a first terminal coupled to the second input terminal of the reverse noise generating circuit 201, and a second terminal connected to the primary side ground reference PGND of the switching mode power supply 20.

The reverse noise generating circuit 201 receives the noise signal Vn, and provides the noise control signal Vp1 based on the noise signal Vn. The primary switch P1 has a first terminal, a second terminal and a third terminal, and is corresponding to a gate terminal, a drain terminal and a source terminal when the primary switch P1 is implemented by MOSFET (Metal Oxide Semiconductor Field Effect Transistor). In the embodiment of FIG. 2, the noise signal Vn is a signal at the gate terminal of the primary switch P1, i.e., the switching control signal G1. In other embodiments, the noise signal Vn could be the signal at the connecting terminal "C" of the primary winding Lp and the primary switch P1. In the embodiment of FIG. 2, the primary switch P1 is an N-type transistor. Thus the phases of the signal at the drain terminal and the gate terminal are opposite. When the signal at the gate terminal of the primary switch P1 is logic high, the primary switch P1 is turned on, then the drain terminal of the primary switch P1 is pulled down to the primary side ground reference PGND, and the signal at the drain terminal is turned to logic low. When the signal at the gate terminal of the primary switch P1 is logic low, the primary switch P1 is turned off, and the signal at the drain terminal is turned to logic high. In the embodiments that the primary switch P1 is a P-type transistor, the source terminal of the P-type transistor is coupled to the primary winding Lp. When the signal at the gate terminal of the primary switch P1 is logic high, the primary switch P1 is turned off, and the signal at the source terminal is turned to logic high. When the signal at the gate terminal of the primary switch P1 is logic low, the primary switch P1 is turned on, and the signal at the source terminal is turned to logic low. In conclusion, the signal at the gate terminal of the primary switch P1 is associated with the signal at the connecting node of the primary winding Lp and the primary switch P1, i.e., has same or opposite phases. Therefore, the signal at the gate terminal of the primary switch P1 may be the same with or the opposite to the signal at the connection node "C" of the primary winding Lp and the primary switch P1, depending on the type of the primary switch P1. In either case, the signal at the gate terminal of the primary switch P1 and the signal at the connecting node "C" are pulsing. Thus, the gate terminal of the primary switch P1, and the connection node "C" of the primary switch P1 and the primary winding Lp, are defined as pulse terminals of the primary switch P1. The signals at the pulse terminals of the primary switch P1 could be adopted as the noise signal Vn. Furthermore, signals at the other terminals of the switch mode power supply 20 which corresponds to the switching control signal G1 could also be adopted as the noise signal Vn.

In one embodiment, the adjusting circuit 203 includes a resistor. The amplitude of the noise control signal Vp1 could be regulated by changing the resistance of the resistor. In other embodiments, the adjusting circuit 203 may include other components, like a capacitor, and the amplitude of the noise control signal Vp1 could be regulated by changing the capacitance of the capacitor.

In one embodiment, the coupling circuit 202 includes a capacitor. The coupling circuit 202 couples the noise control signal Vp1 to the secondary side ground reference SGND, thus to counteract the noise at the secondary side ground reference SGND as illustrated before with reference to FIG. 1.

As previously mentioned, the noise at the secondary side ground reference SGND may be coupled to the terminal "B" of the secondary winding Ls through the circuit coupled to the secondary winding Ls. Furthermore, the on and off operation of the secondary side switch D1 also produces switching noise at the terminal "B", and the switching noise may be coupled to the secondary side ground reference SGND. Therefore, in some embodiments, the second terminal of the coupling circuit 202 is coupled to the terminal "B" of the secondary winding Ls to counteract the switching noise. That is to say, the second terminal of the coupling circuit 202 may be coupled to either terminal of the secondary winding Ls.

The reverse noise generating circuit 201, the coupling circuit 202 and the adjusting circuit 203 may be independent or may represent any combination of one or more components.

Figure 3:
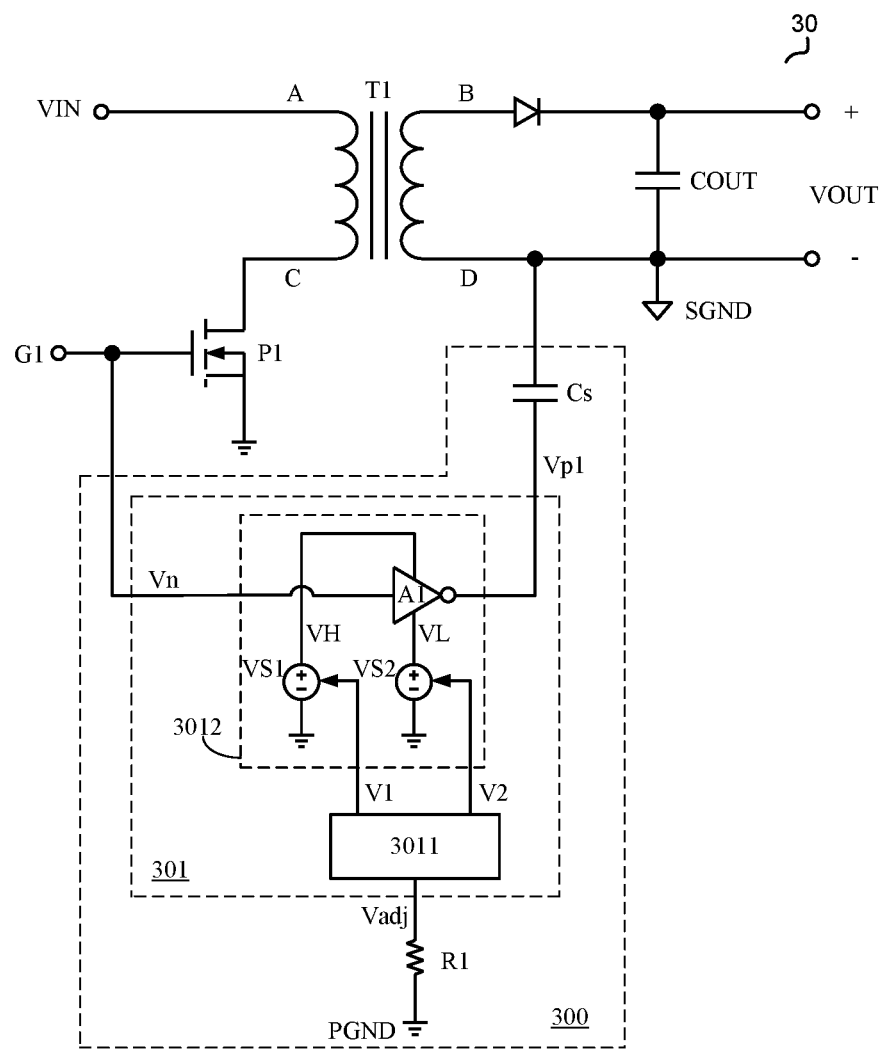
FIG. 3 schematically shows a switching mode power supply 30 in accordance with an embodiment of the present invention.

FIG. 3 schematically shows a switching mode power supply 30 in accordance with an embodiment of the present invention. The switching mode power supply 30 has the flyback topology, and includes the transformer T1, the primary switch P1, the secondary switch D1, and a noise control circuit 300 as shown in FIG. 3. The noise control circuit 300 comprises a reverse noise generating circuit 301, a resistor R1 and a capacitor Cs. The reverse noise generating circuit 301 comprises: a detecting circuit 3011, having an input terminal coupled to the resistor R1, a first output terminal configured to provide a first voltage regulating signal V1 and a second output terminal configured to provide a second voltage regulating signal V2 in response to the resistance of the resistor R1; a logic circuit 3012, having a power source terminal configured to receive the first voltage regulating signal V1, a ground reference terminal configured to receive the second voltage regulating signal V2, an input terminal configured to receive the noise signal Vn, and an output terminal configured to provide the noise control signal Vp1 in response to the first voltage regulating signal V1, the second voltage regulating signal V2 and the noise signal Vn.

In the embodiment of FIG. 3, the logic circuit 3012 includes an inverter A1, a first voltage source VS1 and a second voltage source VS2. The first voltage source VS1 has a control terminal configured to receive the first voltage regulating signal V1, and an output terminal configured to provide a first voltage signal VH, wherein a value of the first voltage signal VH is controlled by the first voltage regulating signal V1. The second voltage source VS2 has a control terminal configured to receive the second voltage regulating signal V2, and an output terminal configured to provide a second voltage signal VL, wherein a value of the second voltage signal VL is controlled by the second voltage regulating signal V2. The inverter A1 has a power terminal configured to receive the first voltage signal VH, and a ground reference terminal configured to receive the second voltage signal VL, an input terminal configured to receive the noise signal Vn, and an output terminal configured to provide the noise control signal Vp1. In one embodiment, when the noise signal Vn is lower than a threshold of the inverter A1, the noise control signal Vp1 has a value equal to the first voltage signal VH, and when the noise signal Vn is higher than the threshold of the inverter A1, the noise control signal Vp1 has a value equal to the second voltage signal VL. In some embodiments, the inverter A1 has hysteresis thresholds, i.e., the threshold of the inverter A1 comprises an upper limit and a lower limit. When the noise signal Vn is lower than the lower limit of the inverter A1, the noise control signal Vp1 has a value equal to the first voltage signal VH, and when the noise signal Vn is higher than the upper limit of the inverter A1, the noise control signal Vp1 has a value equal to the second voltage signal VL. It should be understood that, the phase of the noise control signal Vp1 is the same with the phase of the noise signal Vn when placing an odd number of inverters in front of the inverter A1, while the phase of the noise control signal Vp1 is opposite to the phase of the noise signal Vn when placing an even number of inverters. The phase of Vp1 is also related to the respective noise strengths of the primary and secondary sides. That is to say, whether the noise control signal Vp1 has the same phase or different phase with the noise signal Vn depends on the real application circuit. As illustrated with reference to FIG. 2, the input terminal of the reverse noise generating circuit 301 may be coupled to the connection node "C" of the primary switch P1 and the primary winding Lp in some embodiments.

In some embodiments, the detecting circuit 3011 comprises a current source circuit and a reference circuit. The current source circuit provides a current to the resistor R1 to produce an adjusting signal Vadj across the resistor R1. The reference circuit provides the first voltage regulating signal V1 and the second voltage regulating signal V2 based on the adjusting signal Vadj. That is to say, the values of the first voltage regulating signal V1 and the second voltage regulating signal V2 are regulated by the adjusting signal Vadj, and are further regulated by changing the resistance of the resistor R1.

In some embodiments, the detecting circuit 3011 could be implemented by digital circuits generated by describing the function of the detecting circuit 3011 with hardware description languages, e.g., VHDL, Verilog, etc. In one embodiment, the detecting circuit 3011 comprises a look-up table. The detecting circuit 3011 detects the resistance of the resistor R1, and provides the corresponding first voltage regulating signal V1 and second voltage regulating signal V2 based on the resistance of the resistor R1.

The values of the first voltage regulating signal V1 and the second voltage regulating signal V2 may be the same or may be different. The first voltage regulating signal V1 controls the value of the first voltage signal VH, and the second voltage regulating signal V2 controls the value of the second voltage signal VL. Since the first voltage regulating signal V1 and the second voltage regulating signal V2 are controlled by the resistance of the resistor R1, the first voltage signal VH and the second voltage signal VL are controlled by the resistance of the resistor R1 too.

In the embodiment of FIG. 3, the phase of the noise control signal Vp1 is opposite to the phase of the noise signal Vn, and the amplitude of the noise control signal Vp1 is determined by the first voltage signal VH and the second voltage signal VL. The noise control signal Vp1 is coupled to the secondary side ground reference SGND by the capacitor Cs. The switching noise of the switching mode power supply 30 could be decreased by regulating the resistance of the resistor R1 based on the detected noise at the power supply terminal "A" of the switching mode power supply 30.

Figure 4:
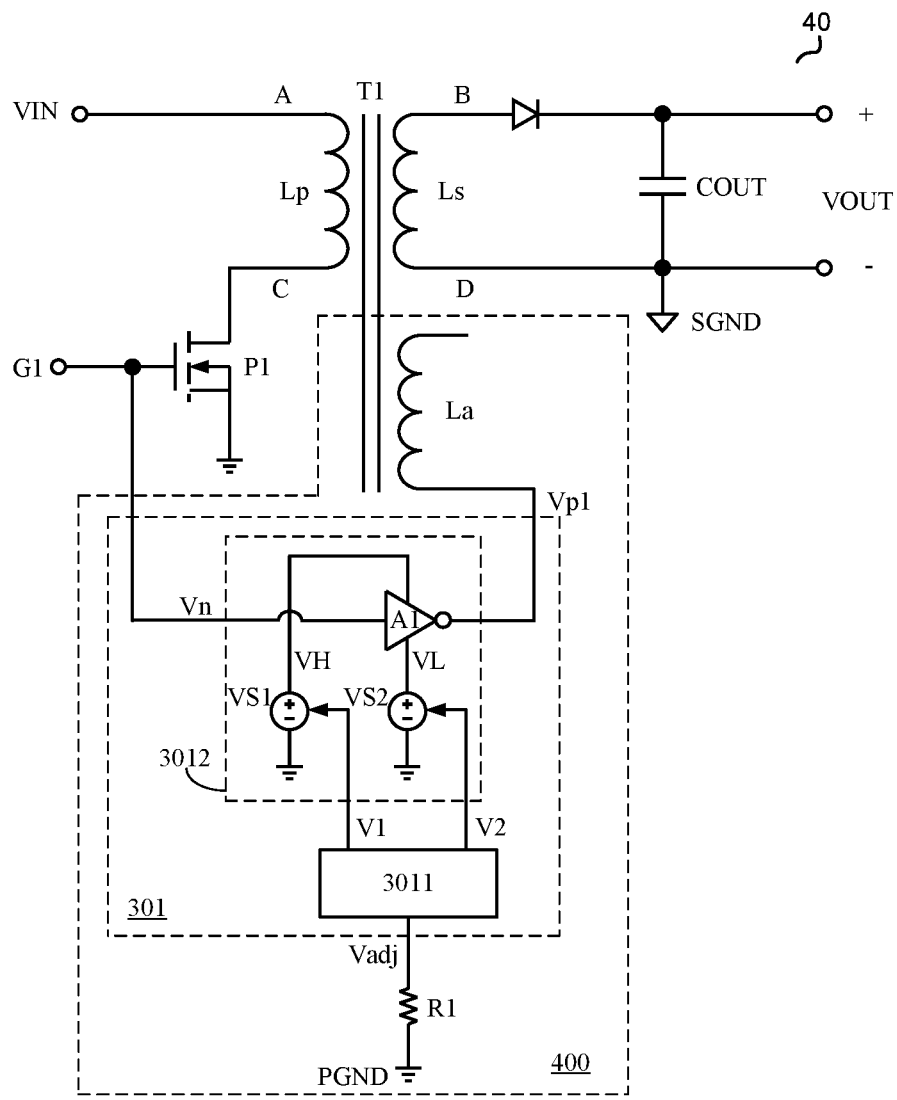
FIG. 4 schematically shows a switching mode power supply 40 in accordance with an embodiment of the present invention.

FIG. 4 schematically shows a switching mode power supply 40 in accordance with an embodiment of the present invention. The switching mode power supply 40 is similar with the switching mode power supply 30 and includes a noise control circuit 400 as shown in FIG. 4. In FIG. 4, an auxiliary winding La, instead of the capacitor Cs in FIG. 3, is configured as the coupling circuit. The auxiliary winding La has a first terminal coupled to the output terminal of the reverse noise generating circuit 301 to receive the noise control signal Vp1, and a second terminal left floating. The noise control signal Vp1 is coupled to the secondary side by a parasitic capacitor between the auxiliary winding La and the secondary winding Ls. In the embodiment of FIG. 4, the coil directions of the auxiliary winding La and the primary winding Lp are the same. Persons of ordinary skill in the art could determine the coil directions of the auxiliary winding La and the primary winding Lp be the same or different according to the real applications.

Figure 5:
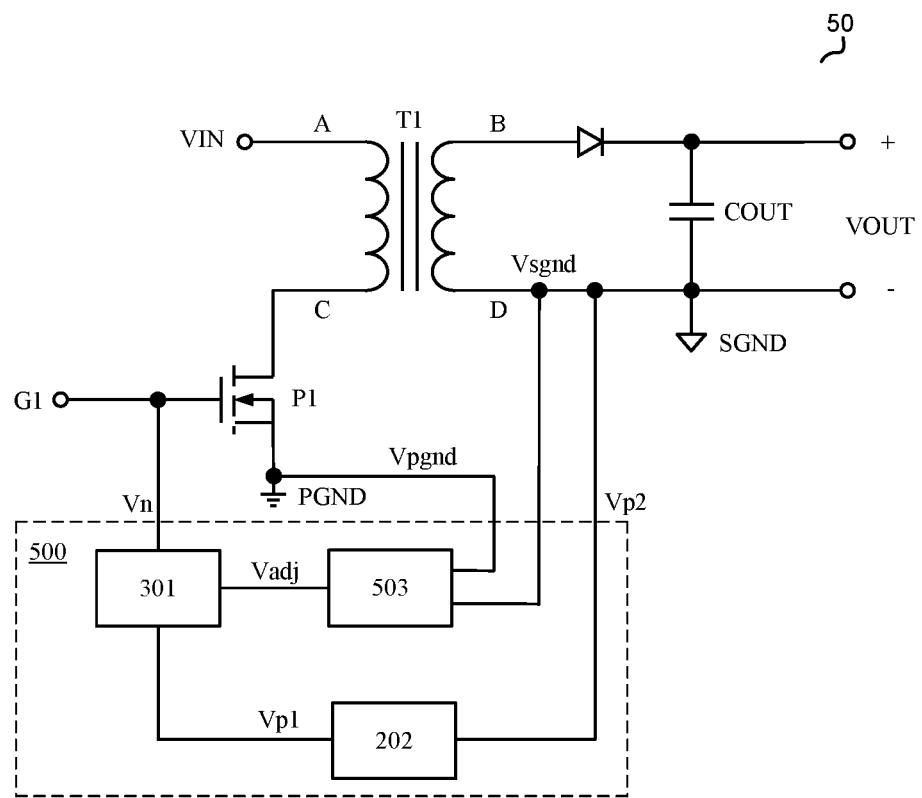
FIG. 5 schematically shows a voltage converter 50 in accordance with an embodiment of the present invention.

FIG. 5 schematically shows a switching mode power supply 50 in accordance with an embodiment of the present invention. The switching mode power supply 50 includes a noise control circuit 500 as shown in FIG. 5. The noise control circuit 500 includes: a feedback circuit 503, having a first input terminal coupled to the secondary side ground reference SGND, a second input terminal coupled to the primary side ground reference PGND, and an output terminal configured to provide the adjusting signal Vadj based on a current between the secondary side ground reference SGND and the primary side ground reference PGND; the reverse noise generating circuit 301, having the first input terminal configured to receive the noise signal Vn, the second input terminal configured to receive the adjusting signal Vadj, and the output terminal configured to provide the noise control signal Vp1 based on the noise signal Vn and the adjusting signal Vadj; and the coupling circuit 202, having the first terminal coupled to the output terminal of the reverse noise generating circuit 301 to receive the noise control signal Vp1, and the second terminal coupled to the secondary side ground reference SGND of the switching mode power supply 50.

In the embodiment of FIG. 5, the feedback circuit 503 provides the adjusting signal Vadj based on the current between the primary side ground reference PGND and the secondary side ground reference SGND. In one embodiment, the feedback circuit 503 comprises a resistor. The current between the primary side ground reference PGND and the secondary side ground reference SGND flows through the resistor and produce the adjusting signal Vadj across the resistor.

In some embodiments, the feedback circuit 503 may have a terminal coupled to the terminal "B" of the secondary winding Ls, and provide the adjusting signal Vadj based on the signal at the terminal "B".

Figure 6:
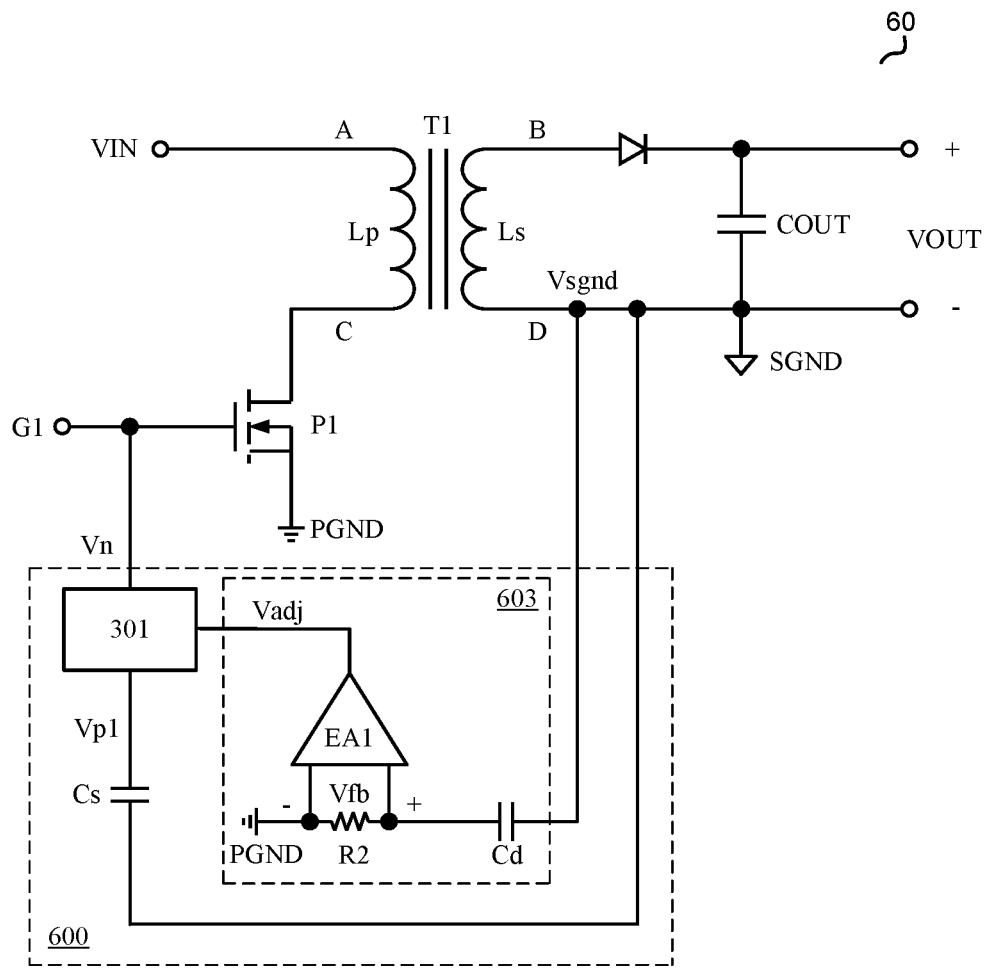
FIG. 6 schematically shows a switching mode power supply 60 in accordance with an embodiment of the present invention.

FIG. 6 schematically shows a switching mode power supply 60 in accordance with an embodiment of the present invention. The switching mode power supply 60 comprises a noise control circuit 600 as shown in FIG. 6. The noise control circuit 600 includes: the reverse noise generating circuit 301, the capacitor Cs and the feedback circuit 603. The feedback circuit 603 includes a noise detecting capacitor Cd, a noise detecting resistor R2 and an amplifier EA1. The noise detecting capacitor Cd and the noise detecting resistor R2 are coupled in series between the primary side ground reference PGND and the secondary side ground reference SGND, and introduces the noise between the primary side ground reference PGND and the secondary side ground reference SGND to the feedback circuit 603 in form of a current, and produces a feedback voltage Vfb across the noise detecting resistor R2. The amplifier EA1 receives the feedback voltage Vfb, and provides the adjusting signal Vadj based on the feedback voltage Vfb. In one embodiment, the adjusting signal Vadj is an amplified signal of the feedback voltage Vfb.

Similar with the operation of the embodiment in FIG. 3, the reverse noise generating circuit 301 receives the adjusting signal Vadj, and provides the noise control signal Vp1 based on the adjusting signal Vadj and the noise signal Vn. The noise control signal Vp1 is coupled to the secondary side ground reference SGND by the capacitor Cs to counteract the noise at the secondary side ground reference SGND.

It could also be understood that in the embodiment of FIG. 6, the noise control circuit 600 sets a loop for the noise at the secondary side ground reference SGND to prevent the noise to be transmitted to the power supply terminal of the switching mode power supply 60.

In one embodiment, the noise control signal Vp1 is coupled to the terminal "B" by the capacitor Cs to counteract the noise at the terminal "B" of the secondary winding Ls, thus to prevent the noise to be transmitted to the power supply terminal of the switching mode power supply 60.

Figure 7:
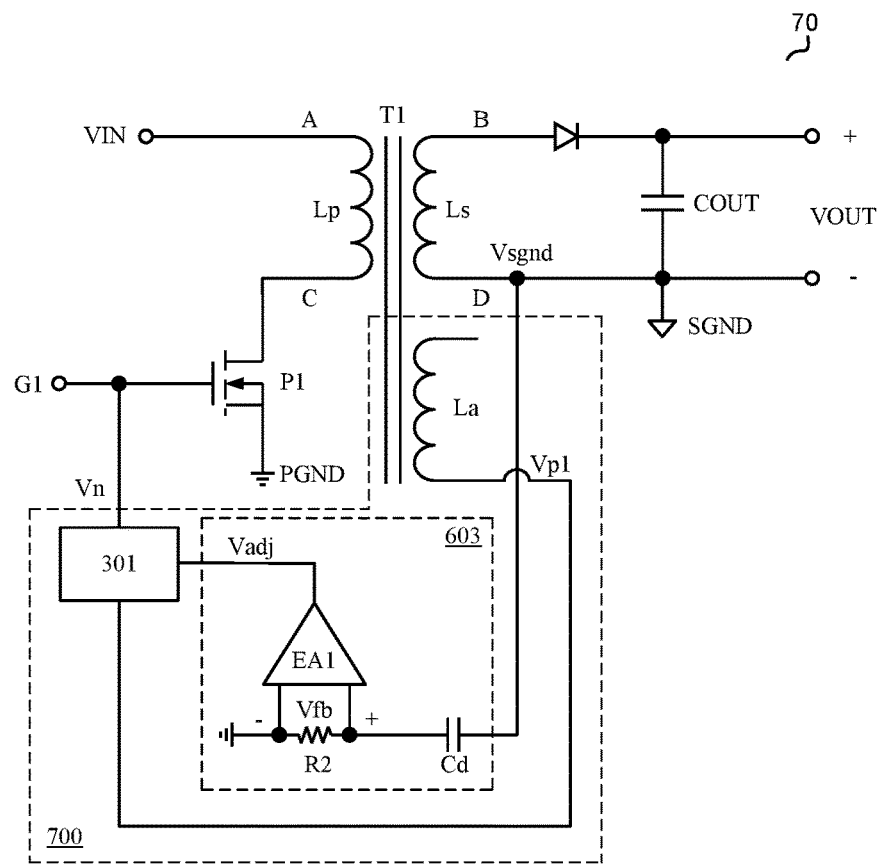
FIG. 7 schematically shows a switching mode power supply 70 in accordance with an embodiment of the present invention.

FIG. 7 schematically shows a switching mode power supply 70 in accordance with an embodiment of the present invention. The switching mode power supply 70 includes a noise control circuit 700. In FIG. 7, the auxiliary winding La, instead of the capacitor Cs in FIG. 6, is configured as the coupling circuit. The auxiliary winding La has the first terminal coupled to the output terminal of the reverse noise generating circuit 301 to receive the noise control signal Vp1, and the second terminal left floating. The noise control signal Vp1 is coupled to the transformer T1 by a parasitic capacitor between the auxiliary winding La and the secondary winding Ls, to counteract the noise from the primary side circuit to the secondary side circuit via the transformer T1, thus to decrease the noise coupled to the power supply terminal of the switching mode power supply.

Figure 8:
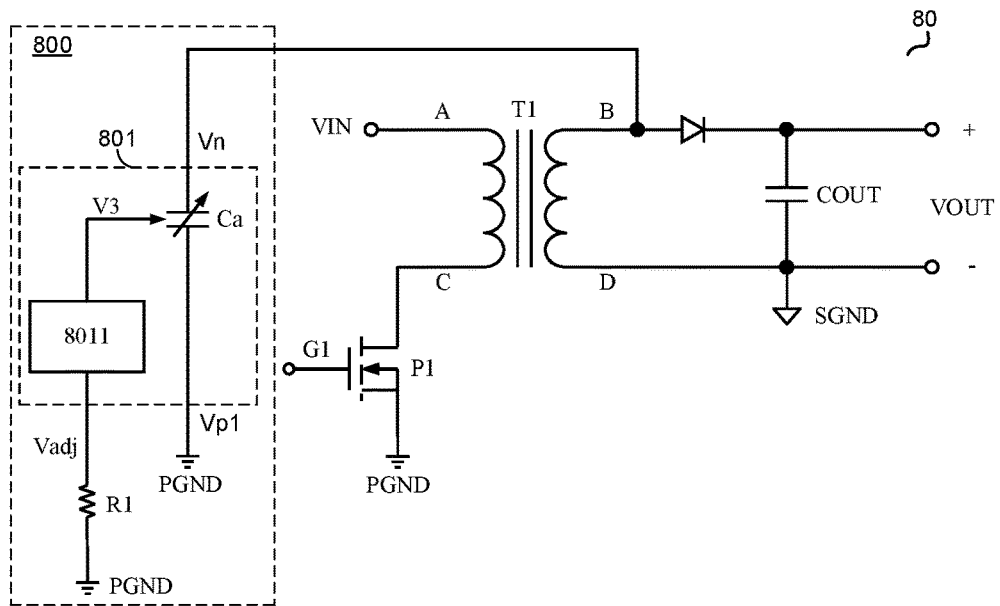
FIG. 8 schematically shows a switching mode power supply 80 in accordance with an embodiment of the present invention.

FIG. 8 schematically shows a switching mode power supply 80 in accordance with an embodiment of the present invention. In FIG. 8, the switching mode power supply 80 includes a noise control circuit 800 which comprises a reverse noise generating circuit 801. The reverse noise generating circuit 801 has an input terminal coupled to a pulse terminal of the secondary switch D1, i.e., the terminal "B", to receive the noise signal Vn, a regulating terminal configured to receive the adjusting signal Vadj, and an output terminal configured to provide the noise control signal Vp1 to the primary side ground reference PGND. The pulse terminal of the secondary switch D1 is defined as a terminal of the secondary switch D1 at which the signal is pulsing, i.e., the terminal coupled to the terminal "B" in FIG. 8. In the embodiment of FIG. 8, the reverse noise generating circuit 801 includes a variable capacitor Ca and a detecting circuit 8011. The detecting circuit 8011 comprises an input terminal coupled to the resistor R1, and an output terminal configured to provide a capacitance regulating signal V3 based on the resistance of the resistor R1. The variable capacitor Ca has a first terminal coupled to the pulse terminal "B" of the secondary switch D1, a second terminal coupled to the primary side ground reference PGND, and a regulating terminal configured to receive the capacitance regulating signal V3, wherein the capacitance regulating signal V3 regulates the capacitance of the capacitor Ca. The capacitor Ca couples the noise at the terminal "B" to the primary side ground reference PGND, to counteract the noise at the primary side ground reference PGND. From another perspective, the capacitor Ca provides a loop to introduce the noise of the secondary side circuit to the primary side ground reference PGND, to prevent the noise of the secondary side circuit to be transmitted to the power supply terminal "A" of the switching mode power supply 80.

In some embodiments, the detecting circuit 8011 includes a current source circuit and a reference circuit. The current source circuit provides a current to the resistor R1 to produce the adjusting signal Vadj across the resistor R1. The reference circuit provides the capacitance regulating signal V3 based on the adjusting signal Vadj.

In some embodiments, the detecting circuit 8011 could be implemented by digital circuits generated by describing the function of the detecting circuit 8011 with hard ware description languages, e.g., VHDL, Verilog, etc. In one embodiment, the detecting circuit 8011 comprises a look-up table. The detecting circuit 8011 detects the resistance of the resistor R1, and provides the corresponding capacitance regulating signal V3 based on the resistance of the resistor R1.

In the embodiment of FIG. 8, the capacitance of the capacitor Ca is determined by the resistance of the resistor R1 which is regulated by the noise at the primary side ground reference PGND. The noise at the terminal "B" is then coupled to the primary side ground reference PGND by the capacitor Ca and is regulated by the noise at the primary side ground reference PGND, thus could counteract the noise at the primary side ground reference PGND.

Figure 9:
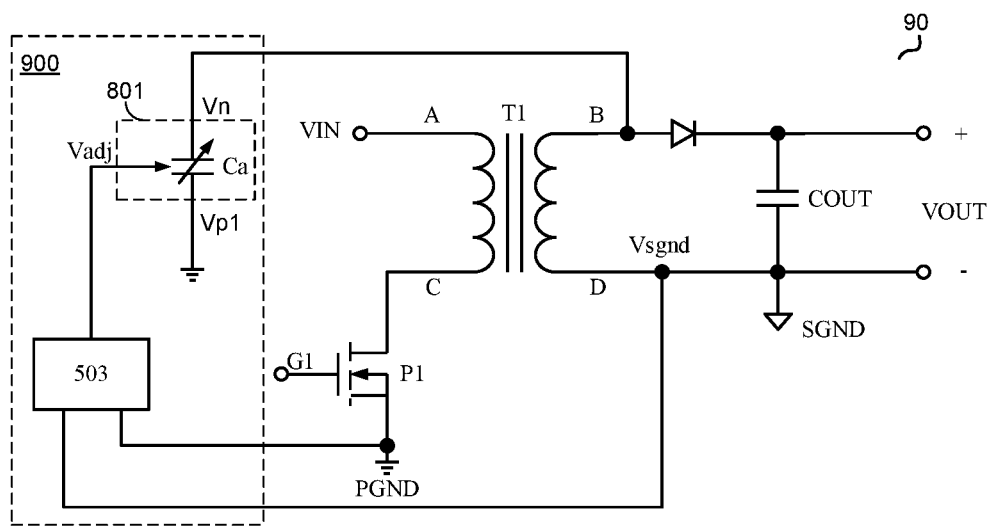
FIG. 9 schematically shows a switching mode power supply 90 in accordance with an embodiment of the present invention.

FIG. 9 schematically shows a switching mode power supply 90 in accordance with an embodiment of the present invention. As shown in FIG. 9, the switching mode power supply 90 comprises a noise control circuit 900. The noise control circuit 900 comprises the reverse noise generating circuit 801 and the feedback circuit 503. The reverse noise generating circuit 801 comprises the variable capacitor Ca. As previously provided, the feedback circuit 503 provides the adjusting signal Vadj based on the noise between the primary side ground reference PGND and the secondary side ground reference SGND. In the embodiment of FIG. 9, the adjusting signal Vadj regulates the capacitance of the capacitor Ca, which couples the noise at the terminal "B" to the primary side ground reference PGND to counteract the noise at the primary side ground reference PGND. In other words, the capacitor Ca provides a loop for the noise of the secondary side to the primary side ground reference PGND, thus to prevent the noise to be coupled to the power supply terminal "A" of the switching mode power supply 90.

In the embodiment of FIG. 9, the capacitance of the capacitor Ca is decided by the adjusting signal Vadj which is regulated by the noise between the primary side ground reference PGND and the secondary side ground reference SGND. The noise at the terminal "B" is then coupled to the primary side ground reference PGND by the capacitor Ca and is regulated by the noise between the primary side ground reference PGND and the secondary side ground reference SGND, thus could counteract the switching noise of the switching mode power supply 90.

In the embodiments of FIGS. 8 and 9, the second terminal of the variable capacitor Ca is coupled to the primary side ground reference PGND. In some embodiments, the first terminal of the variable capacitor Ca is coupled to the pulse terminal "B", and the second terminal of the variable capacitor Ca is coupled to any terminal at the primary side of the switching mode power supply, e.g., the first terminal, the second terminal, the third terminal of the primary switch P1, the first terminal and the second terminal of the primary winding Lp, i.e. the power supply terminal "A", the connection node "C" of the primary winding Lp and the primary switch P1, the gate terminal of the primary switch P1 and the primary side ground reference PGND.

In the embodiments of the present invention, the capacitor Ca may be a discrete component, or be integrated with the adjusting circuit 8011 or the feedback circuit 503.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A noise control circuit of a switching mode power supply, wherein the switching mode power supply has a primary switch, a secondary switch and a transformer with a primary winding, and a secondary winding having a first terminal and a second terminal, and wherein the primary switch has a first pulse terminal configured to receive a switching control signal for controlling the primary switch, and a second pulse terminal coupled to the primary winding, the noise control circuit comprising:

a reverse noise generating circuit, having a first input terminal coupled to either the first or the second pulse terminal of the primary switch, a second input terminal configured to receive an adjusting signal, and an output terminal configured to provide a noise control signal in response to the adjusting signal and a signal at the pulse terminal that the reverse noise generating circuit is coupled to;

wherein the noise control signal is coupled to either terminal of the secondary winding of the transformer; and wherein the reverse noise generating circuit comprises:

a detecting circuit, configured to receive the adjusting signal, and to provide a first voltage regulating signal and a second voltage regulating signal in response to the adjusting signal; and a logic circuit, having a power source terminal configured to receive the first voltage regulating signal, a ground reference terminal configured to receive the second voltage regulating signal, an input terminal configured to receive the signal at the pulse terminal that the reverse noise generating circuit is coupled to, and an output terminal configured to provide the noise control signal in response to the first voltage regulating signal, the second voltage regulating signal and the signal at the pulse terminal that the reverse noise generating circuit is coupled to.

2. The noise control circuit of claim 1, further comprising:

a coupling circuit including a capacitor, wherein the capacitor has a first terminal coupled to the output terminal of the reverse noise generating circuit, and a second terminal coupled to either terminal of the secondary winding of the switching mode power supply.

3. The noise control circuit of claim 1, further comprising:

an adjusting circuit, having a first terminal coupled to the second input terminal of the reverse noise generating circuit, and a second terminal connected to a primary side ground reference of the switching mode power supply.

4. The noise control circuit of claim 3, wherein the adjusting circuit comprises a resistor.

5. The noise control circuit of claim 3, wherein the adjusting circuit comprises a capacitor.

6. A noise control circuit of a switching mode power supply, wherein the switching mode power supply has a primary switch, a secondary switch and a transformer with a primary winding, and a secondary winding having a first terminal and a second terminal, and wherein the primary switch has a first pulse terminal configured to receive a switching control signal for controlling the primary switch, and a second pulse terminal coupled to the primary winding, the noise control circuit comprising:
- a reverse noise generating circuit, having a first input terminal coupled to either the first or the second pulse terminal of the primary switch, a second input terminal configured to receive an adjusting signal, and an output terminal configured to provide a noise control signal in response to the adjusting signal and a signal at the pulse terminal that the reverse noise generating circuit is coupled to;
- a feedback circuit, having a first input terminal connected to a secondary side ground reference, a second input terminal connected to a primary side ground reference, and an output terminal configured to provide the adjusting signal to the second input terminal of the reverse noise generating circuit; and
- wherein the noise control signal is coupled to either terminal of the secondary winding of the transformer.

7. The noise control circuit of claim 6, wherein the feedback circuit comprises:
- a noise detecting capacitor;
- a noise detecting resistor, coupled in series with noise detecting capacitor between the primary side ground reference and the secondary side ground reference; and
- an amplifier, configured to receive a voltage across the noise detecting resistor, and to provide the adjusting signal in response to the voltage across the noise detecting resistor.

8. The noise control circuit of claim 1, further comprising:
- a coupling circuit including an auxiliary winding, wherein the auxiliary winding has a first terminal coupled to the output terminal of the reverse noise generating circuit, and a second terminal left floating.

9. A noise control circuit of a switching mode power supply, wherein the switching mode power supply has a primary switch with a first terminal, a second terminal and a third terminal, a secondary switch and a transformer with a primary winding and a secondary winding, the primary winding having a first terminal and a second terminal, the noise control circuit comprising:
- a reverse noise generating circuit, having an input terminal coupled to a connection node of the secondary switch and the secondary winding to receive a noise signal, a control terminal configured to receive an adjusting signal, and an output terminal configured to provide a noise control signal in response to the noise signal and the adjusting signal, wherein the noise control signal is coupled to one of the first terminal and the second terminal of the primary winding, the first terminal, the second terminal, the third terminal of the primary switch, and a primary side ground reference; and
- wherein the reverse noise generating circuit comprises:
  a variable capacitor, having a first terminal coupled to the connection node of the secondary switch and the secondary winding, a second terminal coupled to one of the first terminal and the second terminal of the primary winding, the first terminal, the second terminal, the third terminal of the primary switch, and the primary side ground reference.

10. The noise control circuit of claim 9, wherein the reverse noise generating circuit comprises:
- a detecting circuit, configured to receive the adjusting signal, and to provide a capacitance regulating signal in response to the adjusting signal;
- and the variable capacitor further has an regulating terminal configured to receive the capacitance regulating signal.

11. The noise control circuit of claim 10, further comprising:
- an adjusting circuit, having a first terminal coupled to the control terminal of the reverse noise generating circuit, and a second terminal coupled to the primary side ground reference of the switching mode power supply.

12. The noise control circuit of claim 11, wherein the adjusting circuit comprises a resistor.

13. The noise control circuit of claim 11, wherein the adjusting circuit comprises a capacitor.

14. The noise control circuit of claim 9, further comprising:
- a feedback circuit, having a first input terminal connected to a secondary side ground reference of the switching mode power supply, a second input terminal connected to the primary side ground reference of the switching mode power supply, and an output terminal configured to provide the adjusting signal to the control terminal of the reverse noise generating circuit.

15. The noise control circuit of claim 14, wherein the feedback circuit comprises:
- a noise detecting capacitor;
- a noise detecting resistor, coupled in series with the noise detecting capacitor between the primary side ground reference and the secondary side ground reference; and
- an amplifier, configured to receive a voltage across the noise detecting resistor, and to provide the adjusting signal in response to the voltage across the noise detecting resistor.

* * * * *